United States Patent
Brannon et al.

(10) Patent No.: US 7,213,651 B2
(45) Date of Patent: May 8, 2007

(54) METHODS AND COMPOSITIONS FOR INTRODUCING CONDUCTIVE CHANNELS INTO A HYDRAULIC FRACTURING TREATMENT

(75) Inventors: Harold D Brannon, Magnolia, TX (US); William D Wood, Spring, TX (US); Christopher J Stephenson, Houston, TX (US)

(73) Assignee: BJ Services Company, Houston, TX (US)

( * ) Notice: Subject to any disclaimer, the term of this patent is extended or adjusted under 35 U.S.C. 154(b) by 301 days.

(21) Appl. No.: 10/865,315

(22) Filed: Jun. 10, 2004

(65) Prior Publication Data

US 2005/0274523 A1    Dec. 15, 2005

(51) Int. Cl.
*E21B 43/267* (2006.01)
(52) U.S. Cl. .................. 166/308.2; 166/177.5
(58) Field of Classification Search .............. None
See application file for complete search history.

(56) References Cited

U.S. PATENT DOCUMENTS

| | | | |
|---|---|---|---|
| 3,929,191 A | 12/1975 | Graham et al. | 166/276 |
| 3,937,283 A | 2/1976 | Blauer et al. | 166/307 |
| 4,051,900 A | 10/1977 | Hankins | 166/250 |
| 4,074,760 A | 2/1978 | Copeland et al. | 166/276 |
| 4,216,829 A | 8/1980 | Murphey | 166/276 |
| 4,421,167 A | 12/1983 | Erbstoesser et al. | 166/255 |
| 4,502,967 A | 3/1985 | Conway | 166/308 |
| 4,506,734 A | 3/1985 | Nolte | 166/308 |
| 4,509,598 A * | 4/1985 | Earl et al. | 166/308.2 |
| 4,829,100 A | 5/1989 | Murphey et al. | 523/131 |
| 4,830,794 A | 5/1989 | Edgley et al. | 261/62 |
| 4,875,525 A | 10/1989 | Mana | 166/280 |
| 5,074,359 A * | 12/1991 | Schmidt | 166/280.1 |
| 5,103,905 A | 4/1992 | Brannon et al. | 166/250 |
| 5,330,005 A | 7/1994 | Card et al. | 166/280 |
| 5,425,421 A * | 6/1995 | Coleman et al. | 166/250.14 |
| 5,435,391 A * | 7/1995 | Jones | 166/308.1 |
| 5,439,055 A | 8/1995 | Card et al. | 166/280 |

(Continued)

FOREIGN PATENT DOCUMENTS

EP    0 246 800 A1    5/1987

OTHER PUBLICATIONS

Murphey, J.R., et al. "Proppant Flowback Control" *Society of Petroleum Engineers* SPE 19769 pp. 635-644 (1989).

(Continued)

*Primary Examiner*—Zakiya W. Bates
(74) *Attorney, Agent, or Firm*—Howrey LLP

(57) ABSTRACT

Methods for the treatment of subterranean wells involving injecting a first fracturing fluid into a formation, and then injecting at least a second fracturing fluid into the formation in order to create extended conductive channels through a formation are described. The fracturing fluids can be similar in density, viscosity, pH and the other related characteristics. Alternatively, the fracturing fluids can differ in their densities, viscosities, and pH, allowing for variations in the conductive channels formed. Propping agents can also be included in one or both of the injected fluids, further enhancing the conductive channels formed. The described methods aid in minimizing proppant flowback problems typically associated with hydraulic fracturing techniques.

27 Claims, 4 Drawing Sheets

U.S. PATENT DOCUMENTS

| | | | | |
|---|---|---|---|---|
| 5,501,275 | A | 3/1996 | Card et al. | 166/280 |
| 5,908,073 | A | 6/1999 | Nguyen et al. | 166/276 |
| 5,916,933 | A | 6/1999 | Johnson et al. | 523/208 |
| 5,921,317 | A | 7/1999 | Dewprashad et al. | 166/208 |
| 5,964,289 | A * | 10/1999 | Hill | 166/250.1 |
| 6,059,034 | A | 5/2000 | Rickards et al. | 166/280 |
| 6,070,666 | A | 6/2000 | Montgomery | 166/308 |
| 6,116,342 | A | 9/2000 | Clark et al. | 166/280 |
| 6,138,760 | A | 10/2000 | Lopez et al. | 166/300 |
| 6,172,011 | B1 | 1/2001 | Card et al. | 507/204 |
| 6,209,643 | B1 | 4/2001 | Nguyen et al. | 166/276 |
| 6,330,916 | B1 | 12/2001 | Rickards et al. | 166/280 |
| 6,364,018 | B1 | 4/2002 | Brannon et al. | 166/280 |
| 6,372,678 | B1 | 4/2002 | Youngman et al. | 501/128 |
| 6,776,235 | B1 * | 8/2004 | England | 166/271 |
| 7,001,872 | B2 * | 2/2006 | Pyecroft et al. | 507/211 |
| 7,036,590 | B2 * | 5/2006 | Harris | 166/280.1 |
| 7,036,597 | B2 * | 5/2006 | O'Brien et al. | 166/308.2 |
| 2002/0161087 | A1 | 10/2002 | Heitz et al. | 524/379 |

OTHER PUBLICATIONS

Rahim, Z., et al. "Evaluation of fracture treatments using a layered reservoir description: field examples" *Journal of Petroleum Science and Engineering* 12: 257-267 (1995).

Hammond, P.S. "Settling and slumping in a Newtonian slurry, and implications for proppant placement during hydraulic fracturing of gas wells" *Chemical Engineering Science* 50: 20, 3247-3260 (1995).

Armstrong, K, et al. "Advanced fracturing fluids improve well economics" *Oilfield Review* 7: 3,34-51 (1995).

Stephenson, C.J., et al. "Increased resistance to proppant flowback by adding deformable particles to proppant packs tested in the laboratory" *Society of Petroleum Engineers* SPE 56593 pp. 1-12 (1999).

Stephenson, C., et al. "Exceptional proppant flowback control for the most extreme well environments: the shape of things to come" *Society of Petroleum Engineers* SPE 77681 pp. 1-10 (2002).

Zhang, J.H., Z.H. Liu and S.X. Qu; *Society of Petroleum Engineers*; Xi'an Petroleum Institute; "Simulational Study of Viscous Fingering in Fractured Reservoirs" 1998, 2 pages.

J.W. Ely, J.S. Hargrove, B.C. Wolters, J.C. Kromer; *Society of Petroleum Engineers, Inc.*; "Pipelining: Viscous Fingering Prop Fracture Technique Finds Wide Success in Permian and Delaware Basins" 1993, 2 pages.

D.S. Pope, L.K-W. Leung, Janet Gulbis and V.G. Constien, Schlumberger Dowell, *Society of Petroleum Engineers, Inc.*; "Effects of Viscous Fingering on Fracture Conductivity" Sep. 1994; pp. 491-506.

* cited by examiner

METHODS AND COMPOSITIONS FOR INTRODUCING CONDUCTIVE CHANNELS INTO A HYDRAULIC FRACTURING TREATMENT

FIELD OF THE INVENTION

Methods for the treatment of subterranean wells involving injecting a first fracturing fluid into a formation, and then injecting at least a second fracturing fluid into the formation in order to create extended conductive channels through a formation. The fracturing fluids can be similar in density, viscosity, pH and the other related characteristics. Alternatively, the fracturing fluids can differ in densities, viscosities, and pH, allowing for variations in the conductive channels formed. Propping agents can also be included in one or both of the injected fluids, further enhancing the conductive channels formed.

BACKGROUND OF THE INVENTION

Hydraulic fracturing is one of the petroleum (oil and gas) industry's most complex operations. Applied in an effort to increase the well productivity, in a typical procedure fluids containing propping agents are pressurized and pumped into a well at pressures and flow rates high enough to split the rock and create two opposing cracks extending hundreds of meters out from the sides of the borehole.

Several problems have become associated with such processes, especially with regard to the placement of propping agents in fractures. For example, underdisplacement can occur if the fracture is not completely filled with propping agent in the near wellbore region, greatly reducing productivity due to the closure stresses at the mouth of the fracture near the wellbore. Such problems have been shown to cause the fracture to close upon incomplete fracture fill-up due to the high stress level in the near wellbore region, thereby reducing the effectiveness of the treatment. Similarly, overdisplacement can occur if too large a volume of propping agent is used, causing proppant to settle in the wellbore itself and cover well perforation, thereby potentially limiting and reducing well productivity.

Perhaps the most common problem associated with hydraulic fracturing, however, is that of proppant flowback following the fracturing treatment. In the treatment of subterranean wells and other formations, it is common to place particulate materials, or proppants, into the formation as a filter medium and/or as a propping agent in the near wellbore area and in the fractures extending outwardly from the wellbore. In fracturing operations, proppant is carried out into the fracture when hydraulic pressure is applied to the subterranean rock formation at a level such that cracks, or fractures, develop. Proppant suspended in a viscous fracturing fluid is carried outwardly away from the wellbore within the fractures as they are created and extended with continued pumping. Upon release of the pumping pressure, the proppant materials remain in the fractures holding the separated rock faces in an open position, thereby forming an open channel for the flow of formation fluids back to the wellbore. However, when the proppants themselves are transported back into the wellbore with the production fluids following fracturing, flowback problems arise.

Proppant flowback following hydraulic fracturing treatments has generated numerous concerns within the oil and gas industry. Following a fracture treatment, proppant flowback during cleanup, and over the lifetime of a well, can have many detrimental effects on the success of the treatment, and ultimately on the well itself. The effects include near wellbore collapse or closure, wells sanding or closing up, and damage to both surface equipment and production facilities by abrasion due to the proppant. Further problems can include the need for the separation of solids from the produced fluids, and occasional decreases in the efficiency of the fractured operation since the proppant does not remain within the fracture and may therefore limit the size of the created channel. These problems can in turn lead to reduced or ceased production from a well, increased well production costs, and numerous safety concerns.

In response to the many problems associated with proppant flowback, there have been many techniques and methods described in the art to prevent or control the flowback phenomenon. These include, for example, numerous modified proppants and proppant additives, modified treatment and flowback procedures, installation of screens, modifications to the fracturing fluid components such as crosslinkers, breakers, and buffers, and a variety of other remedial treatments. Several of these approaches are described in the following paragraphs.

For example, U.S. Pat. No. 6,330,916 (issued Dec. 18, 2001) suggests a subterranean formation treatment wherein a blend of fracture proppant material and deformable particulate materials are injected into the formation. The combination of deformable proppant material with the fracture fluid proppant material can combine to cause an increase in fracture conductivity, and in doing so reduce proppant flowback.

U.S. Pat. No. 4,506,734 (issued Mar. 26, 1985) suggests compositions and methods for reducing the viscosity of a fracturing fluid introduced into a subterranean formation. The compositions are introduced into the subterranean formation and are reportedly activated by the closing of the fractures on the compositions. At this point, the viscosity reducing composition, which is a breaker such as an enzyme, oxidizer, acid, and the like, is released and acts upon the hydraulic fracturing fluid to reduce the viscosity, and simultaneously acts to reduce proppant flowback out of the fracture.

A method of preventing displacement of proppant during hydraulic well treatments has been discussed by Erbstoesser, et al. in U.S. Pat. No. 4,421,167 (issued Dec. 20, 1983). According to the specification, buoyant or neutrally buoyant ball sealers are incorporated into the trailing end portion of the fracturing fluid. These ball sealers seat on the well perforations during the final stages of the fracture, resulting in an increase in surface pumping pressure. Such an increase in pressure signals the end of the operation, and minimizes both proppant overdisplacement and proppant flowback in the wellbore.

U.S. Pat. No. 5,103,905 (issued Apr. 14, 1992) offers a method of optimizing the conductivity of a propped, fractured formation containing proppant, a polymer, a delayed breaker and a non-delayed breaker so as to minimize such problems with hydraulic fracturing as proppant flowback. The method generally describes determining after-closure polymer viscosity of the polymer in the fracture, calculating the amount of breaker necessary to reduce the after-closure viscosity of the polymer to attain a selected permeability through the fracture, determining a minimum viscosity of the fracturing fluid containing the proppant, and introducing an effective amount of delayed breaker and non-delayed breaker. The amount of breaker introduced depends upon the results of the calculations performed, and reportedly allows the proppant to be maintained in the fracture.

The addition of fibrous materials to an intimate mixture of particles for fracturing and gravel packing in order to control particulate flowback in subterranean wells has been discussed by Card, et al. in U.S. Pat. No. 5,439,055 (issued Aug. 8, 1995) and U.S. Pat. No. 6,172,011 (issued Jan. 9, 2001). These patents describe methods for fracturing subterranean formations using one or more viscous fluids and a fibrous material as a tail-in so as to stabilize the sand pack while decreasing proppant flowback and/or fines formation. The fibers are described as being natural and synthetic fibrous materials, as well as inorganic fibrous materials.

Other similar approaches have been offered for addressing proppant flowback problems and other fracture-related difficulties, most notably the use of resin-coated proppants, resin consolidation, and/or forced closure techniques. However, these methods generally suffer from having a high cost, and ineffectiveness due to the difficulty in placing such resin-coated proppants uniformly within the fracture and/or the resin coating itself negatively impacting fracture conductivity. Other problems can arise from undesirable chemical interactions between the resin coating and components of the fracturing fluid itself, such as the crosslinking systems that are commonly employed in the art.

Still further approaches to proppant flowback control, and the associated downhole complications, have been suggested in the relevant literature. For example, J. R. Murphy, et al., in SPE 19769 ("Proppant Flowback Control") described the use of epoxy resin-coated fracture sand which reportedly forms a highly conductive, consolidated proppant bed that is resistant to flowback. The use of deformable particles as proppants to control proppant flowback has been reported by C. Stephenson, et al. in SPE paper 56593 ("Increased Resistance to Proppant Flowback by Adding Deformable Particles to Proppant Packs Tested in the Laboratory"), while the use of high-stress, deformable particles having a needle-like shape having a reportedly higher efficiency was reported in SPE 77681 ("Exceptional Proppant Flowback Control for the Most Extreme Well Environments: The Shape of Things to Come").

While most all of the above approaches have merits, they all also have a negative impact on production and production costs, and are not always effective or applicable to a range of situations. Additionally, some flowback control additives, while capable of being successfully applied, carry severe penalties for the retained conductivity of the treated packs, due to the pore volume occupied and their inherent ability to trap migrating fines. These additives can also seriously impact cleanup and production procedures, and exert an undesirable environmental effect.

Thus, there exists a need for a fracturing fluid system for use in hydraulic fracturing which can maintain high conductivity and increase the drag forces at failure to greater than 100%, while at the same time allowing for a "viscous fingering" of the subterranean formation to occur. This fingering could allow for an increase in the overall fracture conductivity of the formation, and simultaneously reduce the pressure gradients associated with production. There is a further need for creating directional control of the fracture, such that the perforations formed in the subterranean formation can be prevented from entering unwanted areas, e.g. water zones. Additionally, there remains a high need for long-term proppant flowback control during fracturing processes.

SUMMARY OF THE INVENTION

The present invention provides methods, compositions, and systems for introducing highly conductive channels into a hydraulic fracturing treatment. Such methods and systems also provide a resultant particulate pack that inhibits the flow of particulates back through the wellbore during the production of hydrocarbons without adversely affecting the permeability of the particulate pack.

In accordance with a first aspect of the present invention, a method of fracturing a subterranean formation penetrated by a wellbore is provided, comprising the steps of introducing a first treatment fluid having a first viscosity and a first density into the subterranean formation, and then introducing a second treatment fluid having a second viscosity and a second density into the same formation, wherein the second fluid contains a proppant. Upon introduction of the first treatment fluid, a first fluid segment is created, extending through the subterranean formation. Subsequent introduction of the second treatment fluid creates a conductive channel within the first created fracture by extending out and through the first fluid segment within the fracture.

In a further aspect of the present invention, a method for fracturing a subterranean formation penetrated by a wellbore is provided, comprising the steps of introducing a first fluid having a first viscosity and a first density and not containing a proppant into the subterranean formation under a pressure sufficient to fracture the formation, fracturing the formation, and then introducing a second fluid having a second viscosity and a second density and a proppant or proppant mixture, thereby introducing a conductive channel through the first fluid.

A further aspect of the present invention is a system for fracturing a subterranean formation comprising a first fracturing fluid having both a first viscosity and a first density, and a second fracturing fluid having a second viscosity and a second density, wherein the viscosity and density of the first and second fracturing fluids are not substantially equivalent.

As another embodiment of the present invention, a method for fracturing a subterranean formation is provided comprising the steps of introducing a first fluid having a first viscosity and a first density into the subterranean formation, and then introducing a second fluid having a second viscosity and a second density into the subterranean formation, wherein the viscosity and density of the first and second fluids are substantially equal.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

FIG. 2A is at time zero, FIGS. 2B and 2C show progression of the viscous fingering, and FIG. 2D shows breakthrough where the less viscous fluid has formed a channel through the more viscous fluid.

DETAILED DESCRIPTION OF THE INVENTION

A first aspect of the present disclosure provides a method for fracturing a subterranean formation, comprising the steps of introducing a first fluid having a first viscosity and a first density into the subterranean formation, and then introducing a second treatment fluid having a second viscosity and second density into the subterranean formation. The second fluid can comprise a proppant, and preferably the viscosity and density of the first and second treatment fluids are not equal, such that the first and second treatment fluids create a fluid segment extending through the subterranean formation, the second fluid creating an extended finger or "conductive channel" within the first created fluid segment in the fracture. The two fluids can have different viscosities prior to the introducing steps, or can have identical viscosities prior to the introducing steps but experience different shear histories. For example, the first fluid can be allowed to "sit static", thereby increasing its viscosity, even though the first fluid and second fluid had identical properties prior to the introducing steps.

A further aspect of the present disclosure provides a method for fracturing a subterranean formation comprising the steps of providing a first fluid having a first viscosity and first density and not containing proppant or propping agent to a subterranean formation under pressure sufficient to fracture the formation, thus fracturing the formation, and then providing a second fluid having a second viscosity and a second density containing a proppant or propping agent to a subterranean formation under a pressure sufficient to fracture the formation, thereby creating a conductive channel that extends through the first fluid. The first and second fluids can be of the same or similar viscosity and densities, or can equally and acceptably have different viscosities and or densities. Proppant can be present in the first fluid, the second fluid, or both the first fluid and second fluid.

Figure 1:
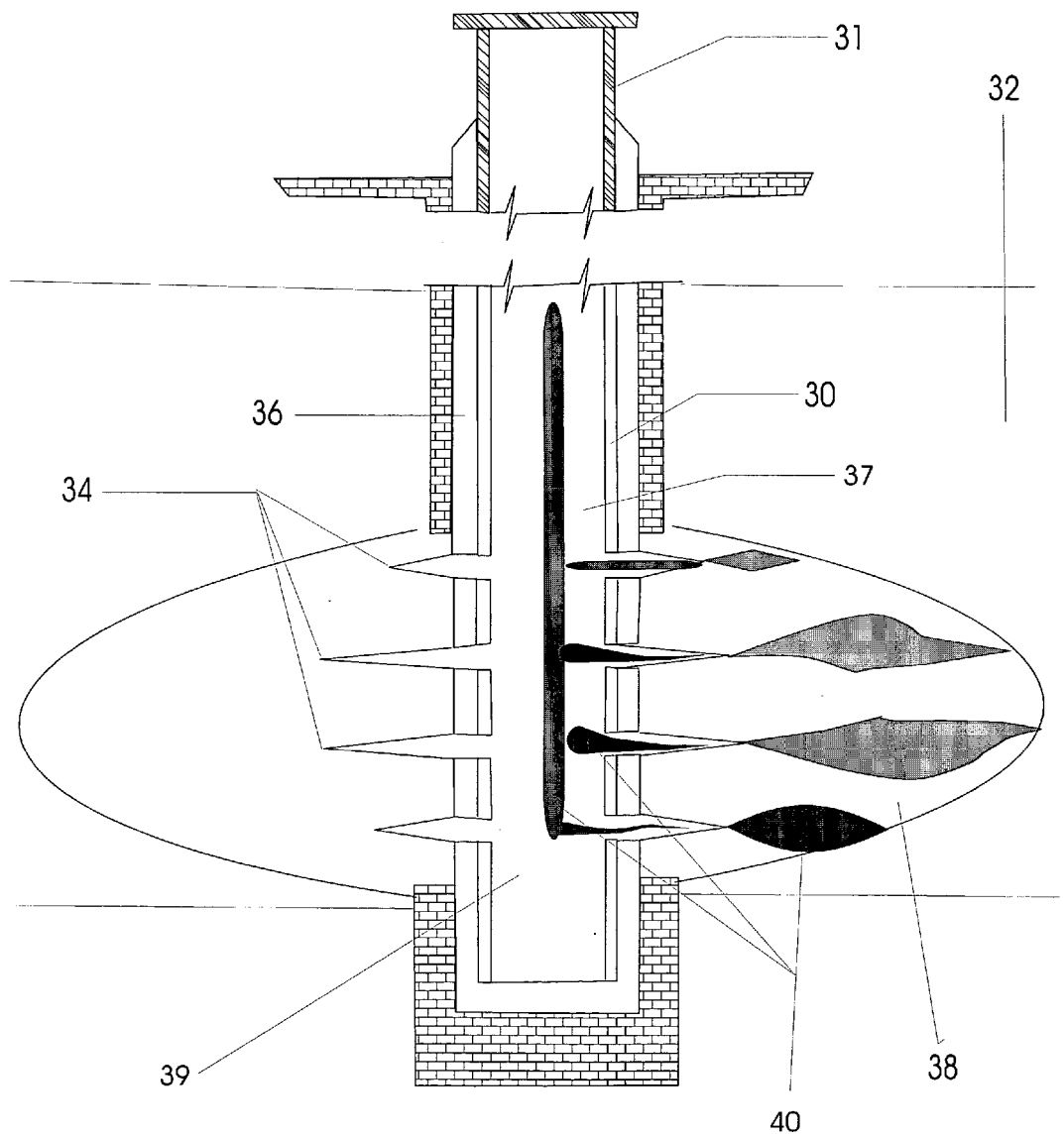
FIG. 1 is a schematic showing the transport of a second fracturing fluid down the well tubulars and into a first fracturing fluid, displacing the first fracturing fluid and forming a conductivity channel.
Figure 2A:
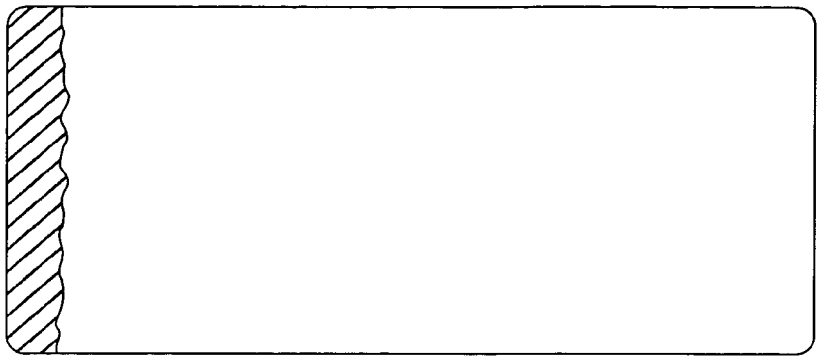
FIGS. 2A–2D show viscous fingering, wherein a less viscous fluid (shaded) is shown to be displacing a more viscous fluid (unshaded) over time.
Figure 2B:
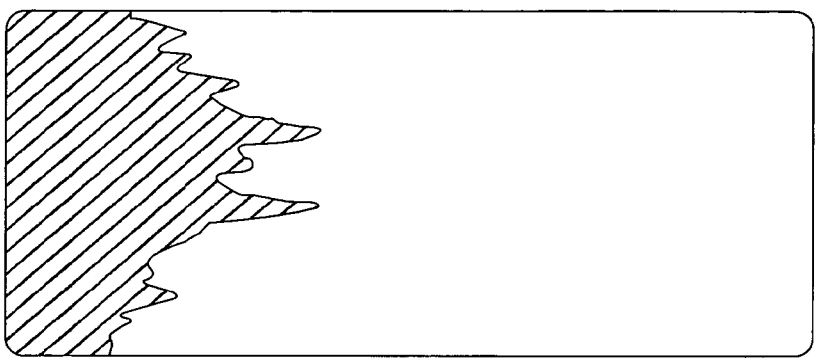
Figure 2C:
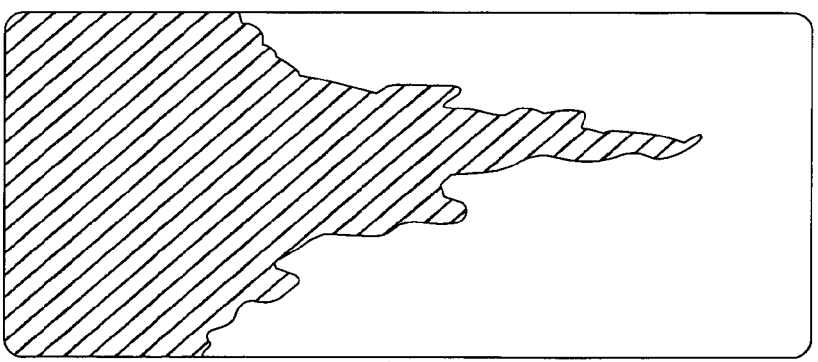
Figure 2D:
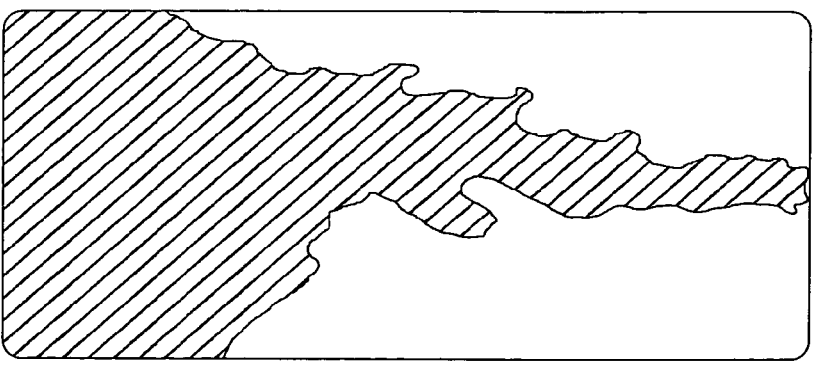

These aspects of the present disclosure, which are specifically adapted for use in hydraulic fracturing of oil wells, gas wells, or even water wells, are depicted schematically in FIG. 1. As referenced in FIG. 1, a typical subterranean well bore scenario is schematically represented, having a well head 31 with a casing 30 extending down from the surface 33 through a hydrocarbon formation 32. The casing 30, cemented in place, is provided with a plurality of perforations 34 which penetrate casing 30 and the cement sheath 36 surrounding the casing. The perforations 34 provide flow paths for fluids to flow into and out of casing 30.

In order to stimulate the productivity of the well, the formation 32 is fractured. This is accomplished by injecting a fracturing fluid from the well head 31 down the casing 30, through perforations 34 and out into the formation 32. Typically, in fracturing operations, the fluid is injected through a tubular injection string positioned inside the casing; however, for purposes of the general illustration, it is not necessary to illustrate the tubing. The injection of the fluid 37 is conducted at a rate and pressure sufficient to cause the formation to fracture, typically forming radially outwardly extending fractures 38 containing a fluid 37. The fluid 37, in accordance with the present invention, can transport propping agent particles such as sand, bauxite, glass beads, ceramic spheres, ultralight proppants (such as LiteProp, commercially available from BJ Services Company, Houston, Tex.) and the like (illustrated as dots 39 in the figure) into the fracture. Typically, the fluid and propping agent are flushed down the casing (or, down the tubing if it is used), out through the perforations 34 and into the hydrocarbon bearing formation 32, optionally including a displacement fluid if necessary.

In accordance with the present invention, a first fracturing fluid 37 having a first density and a first viscosity is injected into the formation 32 at a pressure sufficient to cause a first fracture 38 in formation 32. A second fracturing fluid 40 having a second density and a second viscosity and containing a propping agent or mixture of propping agents, which may or may not be approximately the same as the first density and first viscosity, is injected down casing 30 and through perforations 34, out into the first fracture 38. In doing so, conductive channels are formed within the first fracture 38, allowing for an extension of the fracture, and a more controlled placement of the proppant. Alternatively, the second fracturing fluid 40 can lack a propping agent.

As yet a further aspect of the present disclosure, a system for fracturing a subterranean formation comprising a first fracturing fluid having a first viscosity and a first density, at a pressure sufficient to fracture the formation, and a second fracturing fluid having a second viscosity and second density, comprising a proppant, at a pressure sufficient to fracture the formation, wherein the viscosity and density of the first and second fracturing fluids are not equal. Such a system is useful in the reduction of proppant flowback following the completion of the fracture.

As used herein, the terms "viscous fingering" or "conductive channel" are meant to be synonymous, and refer generally to the effect resulting from injecting a low-viscosity, density, or similar material or fluid into a medium or fluid having a different viscosity, density, or similar characteristic, such that the result is the penetration of the fluid injected through the first fluid, allowing for flow-through to occur. This concept is represented schematically in an idealized situation in FIG. 2, wherein a less viscous fluid (the shaded area) is shown to be displacing a more viscous fluid (the clear area). As time progresses from an initial starting time (t=0 in the figure), the less viscous fluid forms "fingers" into the flow channel, hence the term "viscous fingering". Ultimately, in such processes, upon breakthrough of the less viscous fluid, a large portion of the original fluid may still be in place.

Similarly, the use of the terms "fluid", "fracturing fluid", and "well treatment fluid", as used herein, are meant to be terms related to fluids used in subterranean operations. For example, the term "fluid", as used herein, can be meant to be any fluid which can be used in a subterranean treatment, including fracturing and gravel packing, while the term "fracturing fluid", as used herein, can be meant to refer to those fluids presently used in the field of fracturing and hydraulic fracturing and which serve to aid in the displacement of subterranean formations by high-pressure injection into the formation. The term "well treatment fluid", as used herein, can be meant to mean any number of known water-based, oil-based, emulsion-based, or other similar fluids that can be used to "treat" a subterranean formation in order to overcome a hydrocarbon production problem and increase productivity from the formation, as well as any of the alternative meanings described above.

In embodiments described and disclosed herein, the use of the term "introducing" includes pumping, injecting, pouring, releasing, displacing, spotting, circulating, or otherwise placing a fluid or material within a well, wellbore, or subterranean formation using any suitable manner known in the art. Similarly, as used herein, the terms "combining", "contacting", and "applying" include any known suitable methods for admixing, exposing, or otherwise causing two or more materials, compounds, or components to come together in a manner sufficient to cause at least partial reaction or other interaction to occur between the materials, compounds, or components.

The fluids which are suitable for use with the present invention include any of the known fracturing fluids suitable for use in hydraulic fracturing practice. These fluids can be the same fluids, or alternatively and equally acceptable, they can be different fluids. More specifically, the fracturing fluids suitable for use with the present invention are independently selected from the group consisting of aqueous polymer solutions, aqueous and non-aqueous guar or guar derivative based solutions, starch based polymers, xanthan based polymers, biopolymers such as gum Arabic and carrageenan, gelled aqueous fluids, aqueous surfactant solutions, water-based fluids and brines, non-aqueous fluids, fluids containing gases such as carbon dioxide and/or nitrogen gas, gelled oil solutions, and any combination thereof. For example, the first fluid can be independently selected to be an aqueous polymer solution, and the second solution can be independently selected to be a guar solution.

The fluids and fracturing fluids suitable for use within the present invention can have similar or different viscosities and densities. For example, the first fluid can have a viscosity and density equal to the viscosity and density of the second fluid. Alternatively, and equally acceptable, the viscosity and/or density of the first and second fluids can be different; e.g., the viscosity and/or density of the first fluid can be greater than the viscosity and/or density of the second fluid injected into the subterranean formation, or vice-versa. Typically, the fluids suitable for use within the present invention have densities of about 2.0 pounds per gallon (240 g/L) to about 50.0 pounds per gallon (6,000 g/L), and more preferably about 5.0 pounds per gallon (600 g/L) to about 20.0 pounds per gallon (2400 g/L). The fluids can have equal or unequal densities. In the instance of the densities of the fluids being unequal, the difference in densities should preferably be at least about 2.0 pounds per gallon (237 g/L) in order to obtain good conductive channels through the fracture. Specific densities for fluids suitable for use with the present invention include densities of about 2 lb/gal. (240 g/L), about 5 lb/gal. (599 g/L), about 10 lb/gal. (1198 g/L), about 15 lb/gal. (1797 g/L), about 20 lb/gal. (2397 g/L), about 25 lb/gal. (2996 g/L), about 30 lb/gal. (3595 g/L), about 35 lb/gal. (4194 g/L), about 40 lb/gal. (4793 g/L), about 45 lb/gal. (5392 g/L), about 50 lb/gal. (5991 g/L), and ranges between any two of these values (e.g. about 15 lb/gal. (1797 g/L) to about 35 lb/gal. (4194 g/L)).

Similarly, fluids suitable for use within the present invention have viscosities of about 50 cp to about 2000 cp, and more preferably of about 100 cp to about 500 cp at a temperature of 20° C. to 150° C.

Water based fluids and brines which are suitable for use with the present invention include fresh water, sea water, sodium chloride brines, calcium chloride brines, potassium chloride brines, sodium bromide brines, calcium bromide brines, potassium bromide brines, zinc bromide brines, ammonium chloride brines, tetramethyl ammonium chloride brines, sodium formate brines, potassium formate brines, cesium formate brines, and any combination thereof.

The water based fluids and brines which are suitable for use with the present invention typically have a salt concentration, in water, of about 10 g/L to about 400 g/L, more preferably about 20 g/L to about 200 g/L, and most preferably about 30 g/L to about 100 g/L.

Water based polymer and polymer-containing treatment fluids suitable for use with the present invention include any such fluids that can be mixed with the previously mentioned water based fluids. Specific water based polymer and polymer-containing treatment fluids for use with the present invention include guar and guar derivatives such as hydroxypropyl guar (HPG), carboxymethylhydroxypropyl guar (CMHPG), carboxymethyl guar (CMG), hydroxyethyl cellulose (HEC), carboxymethylhydroxyethyl cellulose (CM-HEC), carboxymethyl cellulose (CMC), starch based polymers, xanthan based polymers, and biopolymers such as gum Arabic, carrageenan, and the like, as well as any combination of the above-mentioned fluids.

In the practice of the disclosed method, a polymer-containing treatment fluid containing at least one polymer or a mixture of polymers as mentioned above may be employed, with or without cross-linker. In one embodiment, a polymer treatment fluid may be a guar or derivatized guar-based fracturing fluid. Typically, a derivatized guar-based polymer-containing treatment fluid is a based on carboxymethyl hydroxypropyl guar polymer. For example, in one embodiment, a 35 lb. gel of carboxymethyl hydroxypropyl guar polymer is employed with a zirconium-based cross-linker. Such a polymer treatment fluid is available as "MEDALLION 3500" or "MEDALLION 3500 LPH" (Low pH), both commercially available from BJ Services Company (Houston, Tex.). Another exemplary embodiment of a suitable crosslinked CMHPG treatment fluid may be a 40 lb gel of carboxymethyl hydroxypropyl guar polymer known as "MEDALLION FRAC 4000 HT" (from BJ Services Company, Houston, Tex.). It will be understood with benefit of this disclosure that the above fluids may be formulated without cross-linker as well. Typically, such polymers are incorporated in the total fracture fluid in an amount of from about 1 pound per thousand gallons ("ppt") of fluid to about 70 pounds per thousand gallons (70 ppt).

Other examples of suitable polymer treatment fluids that may be employed in the practice of the disclosed method include "AQUA FRAC" (non cross-linked guar gelled water), "METHOFRAC" (methanol cross-linked HPG), "VIKING" (borate crosslinked guar), "VIKING D" (delayed-borate crosslinked guar), "SPECTRAFRAC G" (organo-borate crosslinked guar), "XL ACID II" (crosslinked hydrochloric acid-based acrylic polymer), and "POLY EMULSION" (oil and gelled water emulsion), "SUPER RHEO GEL" (cross linked gelled oil), "VISTAR" (zirconium crosslinked CMG), all available from BJ Services Company (Houston, Tex.).

Polymer types suitable for use as polymer substrates include any polymer viscosifier or mixture of polymers known in the art, such as those mentioned elsewhere herein for use in formulation of polymer-containing treatment fluids. Suitable polymer substrates include polysaccharides, synthetic polymers, or mixtures thereof. Examples of such polymers include polysaccharides and/or acrylic polymers. Specific examples of galactomannans include CMHEC (carboxymethyl hydroxylethyl cellulose), HC (hydroxy cellulose), HEC (hydroxyethyl cellulose). Specific examples of polysaccharides include, guar, CMC (carboxymethyl cellulose), CMG (carboxymethyl guar), CMHPG (carboxymethyl hydroxypropyl guar), HPG (hydroxypropyl guar), and xanthan. These polymers are available, for example, from BJ Services Company (Houston, Tex.) as "GW4" (guar), "GW21" (HEC), "GW22" (xanthan gum), "GW24L" (HEC slurry), "GW45" (CMG), "GW27" (guar), "GW28" (CMHEC), "GW32" (HPG), "GW38" (CMHPG) respectively. Slurried counterparts of these polymers are available from BJ Services Company as "XLFC1" (guar), "XLFC1B" (guar), "XLFC2" (HPG), "XLFC2B" (HPG), "XLFC3" (CMPHG) "XLFC3B" (CMHPG), "VSP1" (CMG), and "VSP2" (CMG), respectively. A typical polymer substrate is CMHPG.

In addition to a polymer or a mixture of polymers in the fluids, a polymer-containing treatment fluid suitable for use in the present invention can also include an optional cross-linking agent. In this regard, any cross-linking agent suitable for cross-linking polymers can be employed in the practice of the present invention, including those cross-linking agents known in the art of well treatment. Examples of cross-linking agents suitable for use with the present invention include metal ions, such as aluminum, antimony, zirconium, and titanium-containing compounds such as the organometallics; and borate ion donating materials including organo-borates, mono-borates, poly-borates, mineral borates, and the like.

Finally, non-aqueous treatment fluids can be used in the disclosure of the present invention. Such suitable non-aqueous fluids include alcohols such as methanol, ethanol, isopropanol, and other branched and linear alkyl alcohols; diesel; raw crude oils; condensates of raw crude oils; refined hydrocarbons such as gasoline, naphthalenes, xylenes, toluene and toluene derivatives, hexanes, pentanes, and ligroin; natural gas liquids, gases such as carbon dioxide and nitrogen gas, and combinations of any of the above-described non-aqueous treatment fluids. Alternatively, mixtures of the above non-aqueous fluids with water are also envisioned to be suitable for use with the present invention, such as mixtures of water and alcohol or several alcohols. Mixtures can be made of miscible or immiscible fluids.

In addition to at least one polymer material and an optional cross-linker, a treatment fluid can include at least one breaker material. In this regard, any suitable breaker known in the well treating art may be employed in a polymer treatment fluid. Examples of suitable breaker materials include any of the enzymes disclosed herein or in the patents incorporated by reference herein, and/or one or more oxidative breakers known in the well treating industry. Specific examples of suitable oxidative breakers include encapsulated breakers, such as encapsulated potassium persulfate (such as ULTRAPERM CRB or SUPERULTRAPERM CRB, available from BJ Services Company, Houston, Tex.). Other suitable breakers which may be employed in a polymer treatment fluid include conventional oxidative breakers, such as ammonium peroxydisulfate. Typically, such breakers are included in a polymer treatment fluid in a concentration of between about 0.1 lb/1000 gals (10.3 $g/m^3$) and about 10 lb/100 gals (1031.8 $g/m^3$). Most typically a conventional oxidative breaker is employed with an enzyme pre-treatment fluid comprising a polymer specific enzyme. The second fluid can also be heavily laden with breakers, water and/or scale control additives, paraffin control additives or other chemical components.

In the practice of the disclosed method, any enzyme or mixture of enzymes suitable for degrading or otherwise reducing the viscosity of a polymer containing filter cake and/or gel residue may be employed in the formulation of an enzyme pre-treatment fluid. As previously mentioned, this includes enzymes such as those described in U.S. Pat. No. 5,165,477; U.S. Pat. No. 5,201,370; U.S. Pat. No. 5,247,995; and/or U.S. Pat. No. 5,562,160 which are incorporated herein by reference. In this regard, the enzyme pre-treatment fluids may be tailored to particular polymer-containing treating fluids and/or to specific polymeric organic viscosifiers contained therein. Alternatively, an enzyme treatment fluid may be formulated for particular types or categories of polymer treatment fluids and/or specific polymeric organic viscosifiers common to such polymer treatment fluids. Although any suitable type of enzyme may be employed, most typical enzymes suitable in the practice of the disclosed method include hydrolases, lyases, transferases and oxidoreductases. More typically, hydrolases or lyases, and most typically hydrolases are employed.

Although any hydrolase suitable for degrading and/or otherwise reducing the viscosity of a particular polysaccharide or mixture of polysaccharides may be used, most typically the following categories of hydrolases are employed. For guar containing polymeric fluids, an enzyme treatment fluid typically includes hydrolase enzymes specific to attack mannosidic and galactomannosidic linkages in the guar residue, breaking the molecules into monosaccharide and disaccharide fragments. Under some conditions, these enzymes may hydrolyze the residue completely into monosaccharide fragments. In this regard, the most typical enzyme for guar containing filter cakes are galactomannan hydrolases collectively referred to as galactomannanases and which specifically hydrolyze (1,6)-α-D-galactomarnosidic and the (1,4)-β-D-mannosidic linkages between the monosaccharide units in the guar backbone, respectively. Examples of galactomannanases include GAMMANASE 1.0 L (from Novo Nordisk of Denmark) and ENZYME G (from BJ Services Company; Houston, Tex.).

Although the preceding paragraphs describe several typical embodiments of the employment of enzymes in the fluids suitable for use in the present disclosure, it will be understood by those of skill in the art that characteristics, types, and amounts of the individual components can be varied for individual well and formation conditions, and according to the characteristics of particular polymers and enzymes selected. For example, the volumes of enzyme treatment fluid and enzyme concentration within a fluid can be varied as desired and/or as warranted by the specific conditions of the well site. Additionally, the volume of the enzyme treatment fluid, and/or the concentration of the enzyme in the fluid can be modified as desired and according to individual preferences and considerations including cost, well conditions, and the like.

For example, and in accordance with the present invention, enzyme concentrations within an enzyme treatment fluid can be used in any amount suitable for supplementing breaking of a polymer-containing treatment fluid during fluid flowback after hydraulic fracturing. Specifically, a volume ratio (v/v) of from about 1:1 to about 1:100,000, more preferably from about 1:1 to about 1:10,000, even more preferably from about 1:1 to about 1:1,000, and most preferably from about 1:10 to about 1:100 of enzyme to total volume of enzyme treatment fluid is employed. Enzymes can be used at 0.0002 gpt to about 10 gpt, with 1 gpt being a typical concentration. Dilutions can be easily achieved by adding additional water to an enzyme concentrate.

The above-described fluids suitable for use with the present invention typically have a pH of about 1 to about 14, and more particularly of about 3 to about 12. Preferably, the pH of the first fluid and the second fluid are similar (within about 4 pH units), and are in the range of about 3 to about 10. Specific pH values of the fluids that are suitable for the use with the present invention include pH 1, pH 2, pH 3, pH 4, pH 5, pH 6, pH 7, pH 8, pH 9, pH 10, pH 11, pH 12, pH 13, pH 14, and ranges between any two of these values. The first fluid and second fluid preferably do not chemically react with each other.

In addition to the above-described fluids and their associated additives, proppants can alternatively be included in one or both of the treatment fluids. That is, either the first treatment fluid or the second fluid, or both fluids can contain one or more propping agents. Preferably, the second treatment fluid which forms a conductive channel through the first treatment fluid contains at least one propping agent. Alternatively, and equally acceptable in accordance with the present invention, the first treatment fluid can contain a propping agent, and the second treatment fluid contains a propping agent which can be the same as, or different from, the propping agent of the first treatment fluid. Propping agents which can be employed with treatment fluids used for fracturing in accordance with the present invention include any propping agent suitable for hydraulic fracturing known in the art. Examples include natural materials, silica proppants, ceramic proppants, metallic proppants, synthetic organic proppants, mixtures thereof, and the like. A preferred embodiment involves proppant being present in the first fluid, and being absent from the second fluid.

Natural products suitable for use as proppants include nut shells such as walnut, brazil nut, and macadamia nut, as well as fruit pits such as peach pits, apricot pits, olive pits, and any resin impregnated or resin coated version of these. Typical resin coatings or impregnations include bisphenols, bisphenol homopolymers, blends of bisphenol homopolymers with phenol-aldehyde polymer, bisphenol-aldehyde resins and/or polymers, phenol-aldehyde polymers and homopolymers, modified and unmodified resoles, phenolic materials including arylphenols, alkylphenols, alkoxyphenols, and aryloxyphenols, resorcinol resins, epoxy resins, novolak polymer resins, novolak bisphenol-aldehyde polymers, and waxes, as well as the precured or curable versions of such resin coatings.

Silica proppants suitable for use with the present invention include glass spheres and glass microspheres, glass beads, glass fibers, silica quartz sand, sintered Bauxite, and sands of all types such as white or brown. Typical silica sands suitable for use include Ottawa, Jordan, Brady, Hickory, Arizona, and Chalfont, as well as any resin coated version of these sands. In the case of silica fibers being used, the fibers can be straight, curved, crimped, or spiral shaped, and can be of any grade, such as E-grade, S-grade, and AR-grade.

Ceramic proppants suitable for use with the methods of the present invention include ceramic beads, ultra lightweight porous ceramics, economy lightweight ceramics such as "Econoprop" or "Valuprop" (Carbo Ceramics, Inc., Irving, Tex.), lightweight ceramics such as "Carbolite" or "Naplite", intermediate strength ceramics such as "Carboprop" or "Interprop" (all available from Carbo Ceramics, Inc., Irving, Tex.), and high strength ceramics such as "CarboHSP", "Sintered Bauxite", or "Sinterball" (Carbo Ceramics, Inc., Irving, Tex.), as well as any resin coated or resin impregnated versions of these, such as described above.

Metallic proppants suitable for use with the embodiments of the present invention include aluminum shot, aluminum pellets, aluminum needles, aluminum wire, iron shot, steel shot, and the like, as well as any resin coated versions of these metallic proppants.

Synthetic proppants are also suitable for use with the present invention. Examples of suitable synthetic proppants include plastic particles or beads, nylon beads, nylon pellets, SDVB (styrene divinyl benzene) beads, carbon fibers such as Panex carbon fibers from Zoltek Corporation (Van Nuys, Calif.), lightweight proppants such as LiteProp (BJ Services Company, Houston, Tex.), and resin agglomerate particles similar to "FlexSand MS" (BJ Services Company, Houston, Tex.), as well as resin coated versions thereof.

Additionally, soluble materials suitable for use as proppants are also envisioned to be useful with the methods of the present invention. For example, soluble proppants which are placed in the channels of the created perforations include marble or limestone chips or any other suitable carbonate particulates. Additionally, wax, plastic, or resin particles, either coated or uncoated, which are either soluble through contact with a treatment chemical or can melt and flowback from the fracture are suitable for use as proppants with the present invention.

Suitable with the present invention, propping agents are typically used in concentrations from about 1 to about 18 pounds per gallon (about 120 g/L to about 2,160 g/L) of fracturing fluid composition, but higher or lower concentrations may also be used as required. Proppant sizes suitable for use with the present invention include size ranges from about 4 mesh (4750 microns) to about 200 mesh (75 microns). Also suitable for use with the present invention are proppants having size designations of 6/12, 8/16, 12/18, 12/20, 16/20, 16/30, 20/40, 30/50, 40/70 and 70/140, although any desired size distribution can be used, such as 10/40, 14/20, 14/30, 14/40, 18/40, and the like, as well as any combination thereof (e.g., a mixture of 10/40 and 14/40).

Furthermore, it will be understood with benefit of the present disclosure that an enzyme pre-treatment fluid may precede a polymer-containing treatment fracture fluid having no proppant. Furthermore, the base fluid may also contain other conventional additives common to the well service industry, such as surfactants, and the like.

In one specific exemplary embodiment of a typical fracturing operation in accordance with the present disclosure, a polymer-containing treatment fluid is introduced into a wellbore in a subterranean formation at a rate sufficient to initiate and propagate a fracture in the formation and to place propping agents into the fracture, although it is not necessary that propping agents be employed. For example, a typical fracturing treatment may be performed by hydrating an about 0.24% to about 0.72% (weight/volume [w/v]) galactomannan based polymer, such as guar, in an about 2% (w/v) KCl solution at a pH ranging from about 3 to about 12. During pumping, pH may be adjusted by addition of a buffer, followed by addition of an enzyme breaker, cross-linking agent, proppant and other additives if required.

A second polymer-containing treatment fluid having an appropriately adjusted pH, and alternatively containing a crosslinking agent, is introduced into a wellbore in the same subterranean formation in conjunction with one or more propping agents, such as sintered Bauxite. During the pumping of the second treatment fluid, the pH can similarly be adjusted by the addition of a buffer. As the second fluid is introduced into the formation, a conductive channel begins to form across the formation and through the first, previously introduced treatment fluid.

In an alternative embodiment, a third treatment fluid, which may or may not include a propping agent, is similarly introduced into the subterranean formation, further extending the conductivity channel through the fracture zone, extending from the wellbore perforations back to the extreme far edges of the fractures created in the subterranean formation when the first treatment fluid was introduced. Such a third treatment fluid can optionally contain one or more propping agents, as well as any number of known additives known to those of skill in the art. As a result of such viscous fingering, control of the flowback rate of the treatment or formation fluids, as well as the propping agents incorporated into the fracture, results, as described above.

In an alternative yet equally acceptable embodiment of the present invention, the compositions of the present invention can include the displacement of two different types of propping agents into the subterranean fracture. Such differences can include shape, size, material, coating, and/or chemical reactivity of the coating. In example, the primary proppant pumped into the formation during the treatment can be a resin-coated proppant. Later, an uncoated proppant can be injected and displaced into the fracture at a later time, during a different stage of the fracturing treatment. The result of such displacement would be conductive channels or 'fingers' of uncoated proppant penetrating from the perforations at the wellbore out into the fracture and surrounded on both sides by the resin-coated proppant.

During the fracture closure and heat-up, in the above-described alternative embodiment, the resin-coated proppant would cure and set up, forming a rigid mass within the fracture. Meanwhile, the other proppant in and around the channels would remain relatively loose and more free-flowing. Therefore, during the flowback of the fracturing fluid, and/or the resumed production of hydrocarbons from the subterranean fracture, the unconsolidated material would preferentially flow back to the wellbore, leaving the open channels within the fracture. Numerous of these channels could exist, penetrating out into the fracture radially from each of the perforations in the wellbore.

According to such an alternative embodiment, similar results are expected to be achievable using proppants of differing sizes, such as, for example, a large mesh proppant having channels of a much smaller mesh proppant fingering out into the fracture. Alternatively, and equally acceptable, a small mesh proppant with channels of a larger-mesh proppant could create more conductive paths throughout the fracture. Further, and equally acceptable, a soluble propping material could be fingered out into the fracture, and then later dissolved away during a subsequent treatment or flush, or could even be chemically modified so as to dissolve away during the flowback of the fracturing fluids, or even the hydrocarbon products themselves. Combinations of the above embodiments, or similar variations and combinations of compositions can also be created so as to generate conductive channels within a fracture.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Fracture Conductivity Apparatus

Figure 3A:
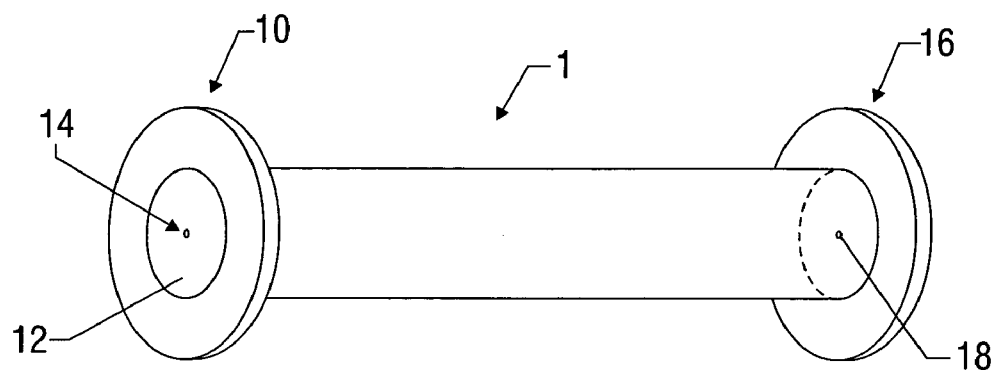
FIG. 3A shows the details of the cylindrical fracturing cell used in laboratory simulations of complex fluid behavior in hydraulic fracturing.

Two different fracture conductivity apparatus was used to experimentally emulate and verify the relationship between fluids of varying viscosity and/or density in a subterranean system. The first slot cell was cylindrical, approximately 6-feet (1.83 m) long and 2-feet (0.61 m) wide, constructed of 1-inch (2.54 cm) thick Plexiglas™ (see FIG. 3A, and FIGS. 4–6). As shown in FIG. 3A, the proximal end 10 of the cell 1 contained an injection port 14 and a septum 12, while the opposite, distal end 16 of the cylindrical cell had an exit port 18 which could be manually controlled. Fluids were pumped through the cell using air-driven accumulator style pumps.

Figure 3B:
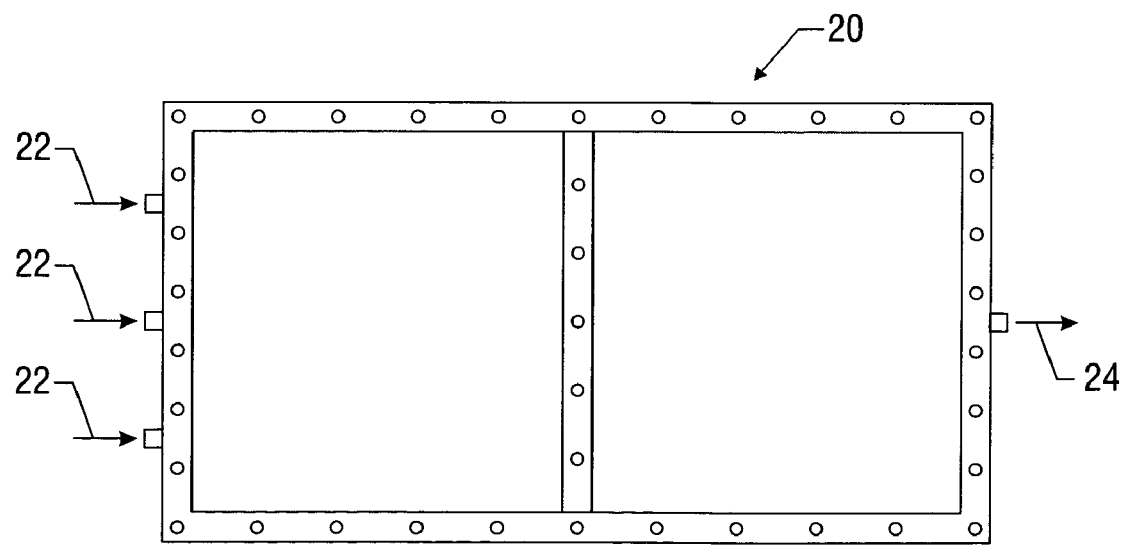
FIG. 3B shows the details of the slot cell fracturing cell used in laboratory simulations of hydraulic fracturing.
Figure 4:
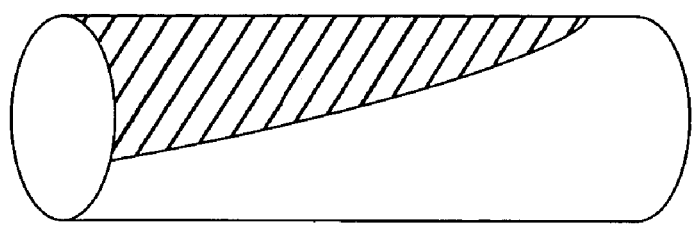
FIG. 4 depicts the fracturing cell of FIG. 3A, wherein an upward-directing finger (shaded) has been produced through the use of two distinct fracturing fluids.

The second fracture conductivity apparatus/slot cell was constructed in order to visually study the effects of the embodiments of the present invention in a simulated, downhole environment. The visualization cell was constructed of transparent Plexiglas™ sheets that were ½ inch (1.27 cm) thick, creating the sides of the slot flow area. The apparatus 20 was roughly 24-inches (61 cm) high and 48-inches (122 cm) wide, and the interior slot dimensions were roughly 21-inches (53.3 cm) high by 44-inches (112 cm) wide and were ½ inch (1.27 cm) thick, as shown in FIG. 3B. The slot cell has inlet ports 22 on one end of the cell, and exit ports 24 at the opposite, laterally spaced end of the cell. Fluids were pumped through the slot cell using two large volume accumulator pumps manufactured from PVC plumbing materials in order to facilitate the rapid loading and injection of fluids into the slot cell. The first pump serves to completely load the cell with one load of material (fluid 1), and then the second pump is used to inject the second load of material (fluid 2, proppant, etc.) through the cell. Such a pump system allows for realistic injection rates, thereby allowing for more realistic flow behavior from the model systems.

The experimental setup also involved equipment which allowed for both the observing and video recording of the flow of material through the slot cell. In a typical procedure, a first base fluid or material is injected into the cell using one of the two pumps. The second fluid or material is commonly dyed with a vegetable dye (such as Eosin-Y or food coloring) in order to give a visual contrast by which to determine formation of conductive channels in the slot cell. The dyed fluid or material was then injected into the cell using the second pump. Depending upon the materials used, viscosity, and density of the materials, a distinct conductive channel ('viscous finger') developed across the cell, and in some instances took on a directionality (e.g., up or down) based upon the characteristics of the materials injected.

Example 2

Fracture Model Producing Upwardly Directing Perforations

The fracture cell shown in FIG. 3A was pumped full of a first fracturing fluid, 40 lb Low pH Medallion (BJ Services Company, Houston, Tex.), using a standard low-pressure reservoir air pump system, at a constant pressure of 15 psi (101 kPa). A second fracturing fluid, Super Rheo-Gel (BJ Services Company, Houston, Tex.) containing bauxite proppant, was then pumped into the fracture cell using the same pump system, at a pressure of 15 psi. As the Rheo-Gel flowed through the cell, it created a perforation that gradually sloped upwards, as shown in FIG. 3. This perforation created by the two fracturing fluids exhibited no apparent intermixing of the fluids at their interfaces.

Example 3

Fracture Model Producing Downwardly Directing Perforations

Figure 5:
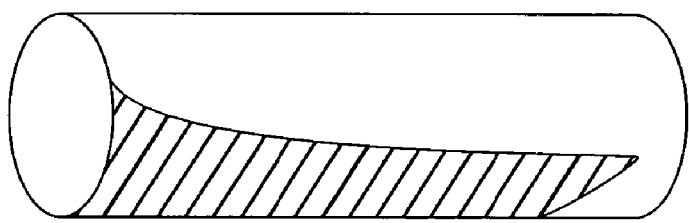
FIG. 5 depicts the fracturing cell of FIG. 3A, wherein a downward-directing finger (shaded) has been produced.

The fracture cell shown in FIG. 3A was pumped full of a first fracturing fluid, 40 lb Low pH Medallion (BJ Services Company, Houston, Tex.), using a standard low-pressure reservoir air pump system, at a constant pressure of 15 psi (101 kPa). A second fracturing fluid, 40 lb SpectraFrac (BJ Services Company, Houston, Tex.) containing 6 psa (pounds sand added) was then pumped into the fracture cell at a constant pressure of 15 psi (101 kPa). As the Spectra-Frac flowed through the cell, it created a viscous finger that gradually sloped downwards, as shown in FIG. 5. This viscous finger created between the two fracturing fluids had no intermixing of the fluids at their interfaces.

Example 4

Fracture Model Producing Parallel Fluid Segments

Figure 6:
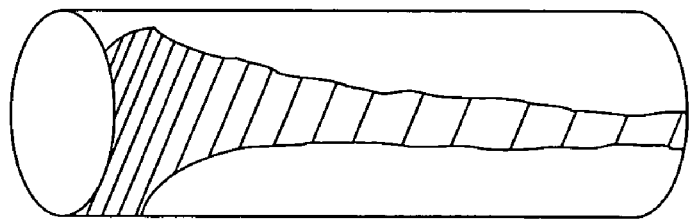
FIG. 6 depicts the fracturing cell of FIG. 3A, wherein the second fracturing fluid and proppant (shaded) have created a channel (or finger) essentially down the center of the first fracturing fluid/proppant mixture (unshaded).

The fracture cell shown in FIG. 3A was pumped full of a first fracturing fluid, 40 lb Low pH Medallion, using a standard low-pressure reservoir air pump system, at a constant pressure of 15 psi (101 kPa). A second fracturing fluid, 30 lb SpectraFrac was then pumped into the fracture cell at a constant pressure of 15 psi (101 kPa). As the 30 lb Spectra-Frac flowed through the cell, it created a viscous finger or fluid segment that was essentially parallel with the center axis of the cell, and extended the entire length of the fracture cell, as shown in FIG. 6. This viscous finger or fluid segment created by the two fracturing fluids had no apparent intermixing of the fluids at their interfaces.

Example 5

Fracture Model Producing Parallel Perforations in cell 2B

Eight gallons (30.3 L) of a crosslinked 14 lb. Vistar (CMG) gel system (BJ Services Company, Houston, Tex.) was manufactured according to standard protocols, and five gallons of this gel system was placed into a first injection pump and subsequently loaded into the cell shown in FIG. 2B. The gel was allowed to sit static for a period of time before the test was begun and the second gel system injected. Meanwhile, the remaining three gallons of crosslinked Vistar gel was dyed with a vegetable dye in order to give a visual contrast by which to determine the formation of conductive channels, or 'fingers', in the slot cell. The dyed gel was introduced into the second injection pump for injection into the slot cell and commencement of the testing. Upon injection of the dyed Vistar gel into the slot cell, a distinct finger began to form. Over time, a conductive channel extending across the entire length of the slot cell had formed.

All of the methods and/or processes disclosed and claimed herein can be made and executed without undue experimentation in light of the present disclosure. While the methods of this invention have been described in terms of preferred embodiments, it will be apparent to those of skill in the art that variations may be applied to the methods and/or processes and in the steps or in the sequence of steps of the methods described herein without departing from the concept and scope of the invention All such similar substitutes and modifications apparent to those skilled in the art are deemed to be within the scope and concept of the invention.

What is claimed is:

1. A method for fracturing a subterranean formation, the method comprising:
   introducing a first treatment fluid having a first viscosity and a first density into the subterranean formation; and
   introducing a second treatment fluid having a second viscosity and a second density into the subterranean formation, wherein
   at least one of the first treatment fluid and the second treatment fluid comprise a proppant;
   the first treatment fluid creates a fluid segment extending through the subterranean formation; and
   the second fluid creates a finger or channel within the fluid segment.

2. The method of claim 1, wherein the first treatment fluid comprises a proppant.

3. The method of claim 1, wherein the second treatment fluid comprises a proppant.

4. The method of claim 1, wherein the first treatment fluid comprises a proppant and the second treatment fluid comprises a proppant.

5. The method of claim 1, wherein the first treatment fluid and the second treatment fluid are independently selected from the group consisting of aqueous polymer solutions, aqueous and non-aqueous guar or guar derivative based solutions, starch based polymers, xanthan based polymers, gum Arabic, carrageenan, gelled aqueous fluids, aqueous surfactant solutions, water-based fluids and brines, non-aqueous fluids, fluids containing carbon dioxide gas, fluids containing nitrogen gas, gelled oil solutions, and combinations thereof.

6. The method of claim 1, wherein the proppant is selected from the group consisting of natural proppants, silica proppants, ceramic proppants, metallic proppants, plastic particles, resin agglomerate particles, synthetic proppants, and soluble proppant materials.

7. The method of claim 1, wherein the first density is about 2.0 pounds per gallon (240 g/L) to about 50.0 pounds per gallon (6,000 g/L).

8. The method of claim 1, wherein the first viscosity is about 50 cp to about 500 cp.

9. The method of claim 1, wherein the second density is about 2.0 pounds per gallon (240 g/L) to about 50.0 pounds per gallon (6,000 g/L).

10. The method of claim 1, wherein the second viscosity is about 50 cp to about 500 cp.

11. The method of claim 1, wherein:
    the first density and the second density are different; and
    the first viscosity and the second viscosity are different.

12. The method of claim 1, wherein:
    the first density and the second density are substantially equal; and
    the first viscosity and the second viscosity are substantially equal.

13. The method of claim 1, wherein the first treatment fluid has a pH of about 1 to about 12.

14. The method of claim 1, wherein the second treatment fluid has a pH of about 1 to about 12.

15. The method of claim 1, further comprising the step of injecting a tail-in fluid after introducing the second treatment fluid.

16. The method of claim 15, wherein the tail-in fluid comprises a proppant.

17. A method for fracturing a subterranean formation, the method comprising:
   introducing a first fluid having a first viscosity and a first density and not containing proppant to a subterranean formation under pressure sufficient to fracture the formation;
   fracturing the formation; and
   introducing a second fluid having a second viscosity and a second density containing a proppant to the subterranean formation under pressure sufficient to further fracture the formation, and creating a conductive channel through the first fluid.

18. The method of claim 17, wherein the first fluid and the second fluid are independently selected from the group consisting of aqueous polymer solutions, aqueous and non-aqueous guar or guar derivative based solutions, starch based polymers, xanthan based polymers, gum Arabic, carrageenan, gelled aqueous fluids, aqueous surfactant solutions, water-based fluids and brines, non-aqueous fluids, fluids containing carbon dioxide gas, fluids containing nitrogen gas, gelled oil solutions, and combinations thereof.

19. The method of claim 17, wherein the proppant is selected from the group consisting of natural proppants, silica proppants, ceramic proppants, metallic proppants, plastic particles, resin agglomerate particles, synthetic proppants, soluble proppant materials, and mixtures thereof.

20. The method of claim 17, wherein the second density is about 2.0 pounds per gallon (240 g/L) to about 50.0 pounds per gallon (6,000 g/L).

21. The method of claim 17 wherein the first density is about 2.0 pounds per gallon (240 g/L) to about 25 pounds per gallon (3000 g/L).

22. The method of claim 17, wherein the pH of the first fluid and the pH of the second fluid are independently about 1.0 to about 12.0.

23. A method for fracturing a subterranean formation, the method comprising:
   introducing a first fluid having a first viscosity and a first density into the subterranean formation; and
   introducing a second fluid having a second viscosity and a second density into the subterranean formation, wherein:
   the first viscosity and the second viscosity are substantially equal;
   the first density and the second density are substantially equal;
   the first fluid creates a fluid segment extending through the subterranean formation; and
   the second fluid creates a finger or channel within the fluid segment.

24. A system for fracturing a subterranean formation, the system comprising:
   a first fracturing fluid having a first viscosity and a first density; and
   a second fracturing fluid having a second viscosity and a second density, and further comprising a proppant, wherein:
   the first viscosity and the second viscosity are different; and
   the first density and the second density are different.

25. The system of claim 24, wherein the first fracturing fluid and the second fracturing fluid are independently selected from the group consisting of aqueous polymer solutions, aqueous and non-aqueous guar or guar derivative based solutions, starch based polymers, xanthan based polymers, gum Arabic, carrageenan, gelled aqueous fluids, aqueous surfactant solutions, water-based fluids and brines, non-aqueous fluids, fluids containing carbon dioxide gas, fluids containing nitrogen gas, gelled oil solutions, and combinations thereof.

26. The system of claim 24, wherein the proppant is selected from the group consisting of natural proppants, silica proppants, ceramic proppants, metallic proppants, plastic particles, resin agglomerate particles, synthetic proppants, soluble proppant materials, and mixtures thereof.

27. The system of claim 24, further comprising a tail-in fluid comprising a viscous fluid and a proppant.

* * * * *